United States Patent
Sheng et al.

(10) Patent No.: US 11,444,913 B2
(45) Date of Patent: Sep. 13, 2022

(54) DATA TRANSMISSION METHOD, APPARATUS, AND SYSTEM

(71) Applicant: Huawei Technologies Co., Ltd., Shenzhen (CN)

(72) Inventors: Jian Sheng, Nanjing (CN); Tao Han, Nanjing (CN); Wei Jiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/327,019

(22) Filed: May 21, 2021

(65) Prior Publication Data

US 2021/0281541 A1    Sep. 9, 2021

Related U.S. Application Data

(63) Continuation of application No. PCT/CN2019/120451, filed on Nov. 23, 2019.

(30) Foreign Application Priority Data

Nov. 29, 2018   (CN) .......................... 201811440792.9

(51) Int. Cl.
| | |
|---|---|
| *G06F 15/16* | (2006.01) |
| *H04L 61/256* | (2022.01) |
| *H04L 43/10* | (2022.01) |
| *H04L 61/251* | (2022.01) |
| *H04L 61/2514* | (2022.01) |
| *H04L 101/663* | (2022.01) |
| *H04L 101/686* | (2022.01) |

(52) U.S. Cl.
CPC ............ *H04L 61/256* (2013.01); *H04L 43/10* (2013.01); *H04L 61/251* (2013.01); *H04L 61/2514* (2013.01); *H04L 2101/663* (2022.05); *H04L 2101/686* (2022.05)

(58) Field of Classification Search
None
See application file for complete search history.

(56) References Cited

U.S. PATENT DOCUMENTS

| | | | | |
|---|---|---|---|---|
| 5,959,974 A | * | 9/1999 | Badt | H04L 69/166 370/233 |
| 6,662,223 B1 | * | 12/2003 | Zhang | H04L 41/5009 709/224 |
| 6,826,172 B1 | * | 11/2004 | Augart | H04L 69/163 370/389 |
| 6,952,421 B1 | * | 10/2005 | Slater | H04L 45/20 370/402 |

(Continued)

FOREIGN PATENT DOCUMENTS

| | | |
|---|---|---|
| CN | 102843373 A | 12/2012 |
| CN | 103036961 A | 4/2013 |

(Continued)

*Primary Examiner* — Phyllis A Book
(74) *Attorney, Agent, or Firm* — Conley Rose, P.C.

(57) ABSTRACT

A data transmission method, implemented by a network device, includes sending a probe packet to a log server, determining whether the log server can receive a packet responsive to whether the network device receives a probe response packet from the log server, and sending a log packet to the log server when the log server can receive a packet. The log packet includes a correspondence between a public Internet Protocol (IP) address and a private IP address.

23 Claims, 6 Drawing Sheets

(56) References Cited

U.S. PATENT DOCUMENTS

| | | | | |
|---|---|---|---|---|
| 7,673,032 B1* | 3/2010 | Augart | ............ | H04L 67/52 |
| | | | | 718/105 |
| 10,110,668 B1* | 10/2018 | Sharma | ............ | H04L 45/74591 |
| 10,171,361 B1* | 1/2019 | Vytla | ............ | H04L 41/0893 |
| 2005/0018618 A1* | 1/2005 | Mualem | ............ | H04L 63/1458 |
| | | | | 709/224 |
| 2009/0135728 A1* | 5/2009 | Shen | ............ | H04L 43/12 |
| | | | | 370/250 |
| 2010/0318665 A1* | 12/2010 | Demmer | ............ | H04L 67/14 |
| | | | | 709/227 |
| 2013/0091273 A1* | 4/2013 | Ly | ............ | H04L 61/2567 |
| | | | | 709/224 |
| 2014/0226457 A1* | 8/2014 | Hsueh | ............ | H04L 43/50 |
| | | | | 370/216 |
| 2014/0280792 A1* | 9/2014 | Sigoure | ............ | H04L 69/40 |
| | | | | 709/224 |
| 2016/0364225 A1* | 12/2016 | Moeller | ............ | H04L 67/12 |
| 2017/0048788 A1* | 2/2017 | Chen | ............ | H04L 65/40 |
| 2019/0081877 A1* | 3/2019 | Wang | ............ | H04L 43/0864 |
| 2019/0190774 A1* | 6/2019 | Kambhampati | ............ | H04L 41/22 |
| 2020/0092252 A1* | 3/2020 | Tillotson | ............ | H04L 12/4633 |
| 2020/0153701 A1* | 5/2020 | Mohan | ............ | H04L 47/365 |
| 2020/0389429 A1* | 12/2020 | Shribman | ............ | H04L 67/563 |

FOREIGN PATENT DOCUMENTS

| | | | | | |
|---|---|---|---|---|---|
| CN | 103532752 A | | 1/2014 | | |
| CN | 103532943 A | * | 1/2014 | | |
| CN | 103532943 A | | 1/2014 | | |
| CN | 105939327 A | | 9/2016 | | |
| CN | 106101264 A | | 11/2016 | | |
| CN | 107196777 A | | 9/2017 | | |
| CN | 108737170 A | | 11/2018 | | |
| CN | 109039825 A | * | 12/2018 | ............ | H04L 43/10 |
| WO | WO-2016184079 A1 | * | 11/2016 | ............ | H04L 41/069 |
| WO | 2018004600 A1 | | 1/2018 | | |

\* cited by examiner

DATA TRANSMISSION METHOD, APPARATUS, AND SYSTEM

CROSS-REFERENCE TO RELATED APPLICATIONS

This application is a continuation of International Patent Application No. PCT/CN2019/120451 filed on Nov. 23, 2019, which claims priority to Chinese Patent Application No. 201811440792.9 filed on Nov. 29, 2018. The disclosures of the aforementioned applications are hereby incorporated by reference in their entireties.

TECHNICAL FIELD

This application relates to the field of communications technologies, and in particular, to a data transmission method, apparatus, and system.

BACKGROUND

An Internet Protocol (IP) address is also referred to as an IP address. An IP address is a uniform address format provided by the IP, and may be allocated by an address server to each network device that supports the IP on the internet. Currently, relatively common IPs are IP version 4 (IPv4) and IP version 6 (IPv6).

As a network device scale on the internet continuously expands, IPv4 addresses are continuously allocated to network devices, and the address are exhausted. Currently, many network devices use IPv4 addresses, and IPv6 addresses are not widely used. Therefore, a network address translation (NAT) technology is proposed.

The NAT technology implements translation between private and public IP addresses. It can be widely used in various network access modes and networks. NAT is classified into static NAT and dynamic NAT. For static NAT, a mapping relationship between private addresses and public addresses is fixed. For dynamic NAT, the mapping relationship between private addresses and public addresses is variable. For example, a plurality of private addresses can be mapped to a same public address in different time periods. Compared with static NAT, dynamic NAT is more flexible in deployment and has higher utilization rate of public IPv4 addresses. For dynamic NAT, a log server needs to be deployed to store a mapping relationship log (also called a log packet) generated by a NAT device to ensure security and meet source tracing requirements of laws and regulations. The mapping relationship log includes a correspondence between a private network address and a public network address of customer premise equipment (CPE). A NAT device refers to a network device that can dynamically map a public network address to a private network address. The NAT device includes a carrier-grade NAT (CGN) device.

Currently, the NAT device generally sends a dynamic mapping relationship log to a log server based on the User Datagram Protocol (UDP). Because the UDP is an unreliable transmission protocol, it cannot be ensured that the log server can receive the mapping relationship log sent by the NAT device. Therefore, storage reliability of the mapping relationship log in the current technology is relatively low.

SUMMARY

Embodiments of this application provide a data transmission method, apparatus, and system, to resolve a problem in other approaches of low log storage reliability.

According to a first aspect, a data transmission method is provided and used for a network device. The method includes sending a probe packet to a log server, determining, depending on whether a probe response packet returned by the log server is received, whether the log server is capable of receiving a packet, and when it is determined that the log server is capable of receiving a packet, sending a log packet to the log server, where the log packet includes a correspondence between a public IP address and a private IP address.

Optionally, the network device is a NAT device. A CPE located in a private network (also referred to as an intranet or an access network) may communicate with a device located in the internet by using the NAT device. The CPE located in the private network sends a data packet to the NAT device, where the data packet carries a private IP address of the CPE, after receiving the data packet carrying the private IP address, the NAT device translates the private IP address in the data packet into a public IP address, and establishes a correspondence between the private IP address and the public IP address, and the NAT device sends a data packet carrying the public IP address to the device located in the internet.

Optionally, the network device periodically sends a probe packet to the log server.

It should be noted that according to the data transmission method provided in this application, the network device sends the probe packet to the log server, determines, depending on whether the probe response packet returned by the log server is received, whether the log server is capable of receiving a packet, and sends the log packet to the log server after it is determined that the log server is capable of receiving a packet, thereby improving reliability of log packet transmission and storage.

In a possible implementation, the probe packet is a heartbeat probe packet, the probe response packet is a heartbeat probe response packet, and determining, depending on whether a probe response packet returned by the log server is received, whether the log server is capable of receiving a packet includes detecting whether a heartbeat probe response packet returned by the log server is received within a first specified period, and when the heartbeat probe response packet returned by the log server is received within the first specified period, determining that the log server is capable of receiving a packet, or when the heartbeat probe response packet returned by the log server is not received within the first specified period, determining that the log server is not capable of receiving a packet.

The heartbeat probe packet may be a request packet, and the heartbeat probe response packet may be an acknowledgement (ACK) packet. When the network device receives the ACK packet, it indicates that the log server has successfully received the request packet.

It should be noted that, when a communications link between the network device and the log server is interrupted or a fault (a hardware fault or an application-layer software fault) occurs on the log server, the log server is not capable of receiving a heartbeat probe packet sent by the network device, and the log server does not return a heartbeat probe response packet to the network device. Therefore, after sending the heartbeat probe packet to the log server, the network device may determine, by detecting whether the heartbeat probe response packet returned by the log server is received within the first specified period, whether the log server is capable of receiving a packet.

Optionally, both the heartbeat probe packet and the heartbeat probe response packet include a payload field, where the payload field is used to carry a packet type, and the packet type of the heartbeat probe packet is different from the packet type of the heartbeat probe response packet.

It should be noted that, by establishing a heartbeat probe mechanism between the network device and the log server, the network device periodically sends a heartbeat probe packet to the log server, it is determined, by detecting whether a heartbeat probe response packet returned by the log server is received, whether the log server is capable of receiving a packet, and a packet is sent to the log server after it is determined that the log server is capable of receiving a packet, thereby improving reliability of the log packet transmission and storage.

In another possible implementation, the probe packet includes an Internet Control Message Protocol (ICMP) probe packet and a UDP probe packet, the probe response packet includes an ICMP probe response packet and a UDP port unreachable packet, and determining, depending on whether a probe response packet returned by the log server is received, whether the log server is capable of receiving a packet includes detecting whether an ICMP probe response packet returned by the log server is received within a second specified period, when the ICMP probe response packet returned by the log server is received within the second specified period, sending a UDP probe packet to the log server, and when a UDP port unreachable packet returned by the log server is received within a third specified period, determining that the log server is not capable of receiving a packet, or when the UDP port unreachable packet returned by the log server is not received within the third specified period, determining that the log server is capable of receiving a packet.

Optionally, the UDP probe packet may be a log packet, and after it is determined that the log server is not capable of receiving a packet, the method further includes stopping sending another log packet to the log server.

It should be noted that the ICMP probe packet is used to detect whether an IP address of the log server is reachable. When the communications link between the network device and the log server is interrupted or a physical port of the log server is unavailable due to a hardware fault on the log server, the log server is not capable of receiving an ICMP probe packet, that is, the IP address of the log server is unreachable.

Optionally, after detecting whether the ICMP probe response packet returned by the log server is received within the second specified period, the method further includes, when the ICMP probe response packet returned by the log server is not received within the second specified period, updating an accumulated quantity of times, where an updated accumulated quantity of times is a quantity of times for which the network device sends an ICMP probe packet to the log server from a moment after a latest ICMP probe response packet returned by the log server is received to a current moment, and when the updated accumulated quantity of times reaches a specified times threshold, determining that the log server is not capable of receiving a packet.

Optionally, when the network device receives the ICMP probe response packet returned by the log server within the second specified period and sends a UDP packet to the log server, the UDP port unreachable packet returned by the log server is received within the third specified period, it is further determined that the log server is not capable of receiving a packet, and the method further includes periodically sending a UDP probe packet to the log server, when the UDP port unreachable packet returned by the log server is not received in n consecutive time periods, determining that the log server is capable of receiving a packet, where n is a positive integer.

It should be noted that an ICMP probe mechanism and a UDP probe mechanism are established between the network device and the log server, where the ICMP probe mechanism is used to detect whether the IP address of the log server is reachable, and the UDP probe mechanism is used to detect whether a UDP port of the log server is available. Whether the log server is capable of receiving a packet may be detected based on the two probe mechanisms. After it is determined that the log server is capable of receiving a packet, a log packet is sent to the log server, thereby improving reliability of log packet transmission and storage.

According to a second aspect, a data transmission apparatus is provided and used for a network device. The apparatus includes a sending unit, configured to send a probe packet to a log server, a detection unit, configured to determine, depending on whether a probe response packet returned by the log server is received, whether the log server is capable of receiving a packet, and the sending unit is further configured to, when it is determined that the log server is capable of receiving a packet, send a log packet to the log server, where the log packet includes a correspondence between a public IP address and a private IP address.

Optionally, the probe packet is a heartbeat probe packet, the probe response packet is a heartbeat probe response packet, and the apparatus further includes a determining unit, the detection unit is configured to determine whether a heartbeat probe response packet returned by the log server is received within a first specified period, the determining unit is configured to, when the heartbeat probe response packet returned by the log server is received within the first specified period, determine that the log server is capable of receiving a packet, and the determining unit is further configured to, when the heartbeat probe response packet returned by the log server is not received within the first specified period, determine that the log server is not capable of receiving a packet.

Optionally, the probe packet includes an ICMP probe packet and a UDP probe packet, and the apparatus further includes a determining unit, the detection unit is configured to determine whether an ICMP probe response packet returned by the log server is received within a second specified period, the sending unit is configured to, when the ICMP probe response packet returned by the log server is received within the second specified period, send the UDP probe packet to the log server, the determining unit is configured to, when a UDP port unreachable packet returned by the log server is received within a third specified period, determine that the log server is not capable of receiving a packet, and the determining unit is further configured to, when the UDP port unreachable packet returned by the log server is not received within the third specified period, determine that the log server is capable of receiving a packet.

Optionally, the apparatus further includes a processing unit, the processing unit is configured to, when the ICMP probe response packet returned by the log server is not received within the second specified period, update an accumulated quantity of times, where an updated accumulated quantity of times is a quantity of times for which the network device sends an ICMP probe packet to the log server from a moment after a latest ICMP probe response packet returned by the log server is received to a current moment, and the determining unit is further configured to, when the updated accumulated quantity of times reaches a specified times threshold, determine that the log server is not capable of receiving a packet.

Optionally, the sending unit is further configured to, after it is determined that the log server is not capable of receiving a packet, periodically send a UDP probe packet to the log server, and the detection unit is configured to, when the UDP port unreachable packet returned by the log server is not received in n consecutive time periods, determine that the log server is capable of receiving a packet, where n is a positive integer.

According to a third aspect, a data transmission apparatus is provided, including a processor and a memory, where the memory is configured to store a computer program, and the computer program includes a program instruction, and the processor is configured to invoke the program instruction to implement the data transmission method according to the first aspect.

According to a fourth aspect, a computer-readable storage medium is provided, where the computer-readable storage medium stores an instruction, when the instruction is executed by a processor, the data transmission method according to the first aspect is implemented.

According to a fifth aspect, a data transmission system is provided, where the system includes a network device and at least one log server, and the network device includes the data transmission apparatus according to the second aspect.

DESCRIPTION OF EMBODIMENTS

To make objectives, technical solutions, and advantages of this application clearer, the following further describes implementations of this application in detail with reference to the accompanying drawings.

Figure 1:
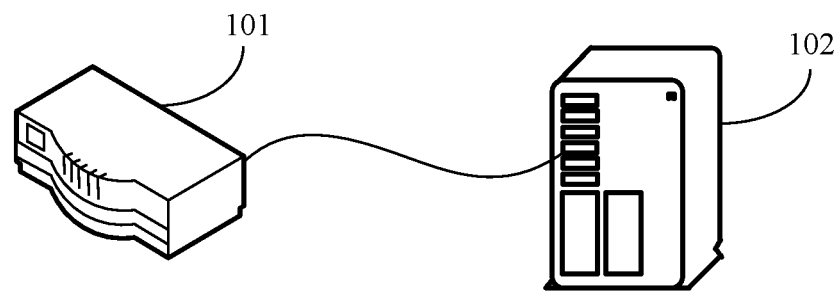
FIG. 1 is a schematic structural diagram of a data transmission system according to an embodiment of this application.

FIG. 1 is a schematic structural diagram of a data transmission system according to an embodiment of this application. As shown in FIG. 1, the system includes a network device 101 and at least one log server 102.

The network device 101 refers to a network device having a function of NAT. Optionally, the network device 101 is a NAT device, for example, a CGN device. The NAT device may be a router or a switch. A type of the network device is not limited in this embodiment of this application. The log server 102 may be one server, a server cluster including several servers, or a cloud computing service center.

Optionally, a CPE located in a private network may communicate, by using the network device 101, with a device located in the internet. The CPE located in the private network sends a data packet to the network device 101, where the data packet carries a private IP address of the CPE, after receiving the data packet carrying the private IP address, the network device 101 translates the private IP address in the data packet into a public IP address, and establishes a correspondence between the private IP address and the public IP address, and the network device 101 sends a data packet carrying the public IP address to the device located in the internet. The CPE located in the private network may be a tablet, a mobile phone, a computer, another terminal device, or the like. In this embodiment of this application, after establishing the correspondence between the private IP address and the public IP address, the network device 101 generates a dynamic mapping relationship log between the private IP address and the public IP address, which is referred to as a log packet for short below. The log server 102 is configured to receive and store the log packet.

Optionally, after generating the log packet, the network device 101 may perform the following working procedures sending a probe packet to a log server, determining, depending on whether a probe response packet returned by the log server is received, whether the log server is capable of receiving a packet, and after it is determined that the log server is capable of receiving a packet, sending the log packet to the log server.

Optionally, the network device 101 may periodically send a probe packet to the log server 102. For example, a timer may be used to periodically trigger the network device to send a probe packet to the log server. The timer may be integrated into the network device, or the timer may be an independent timer set. For example, the network device may send a probe packet to the log server every two seconds. This is not limited in this embodiment of this application.

Optionally, when the network device generates a large quantity of log packets in a running process, a plurality of log servers generally need to be deployed to receive the log packets generated by the network device. For example, when the network device is a CGN device. Because the CGN device is deployed in a core network, and a large quantity of log packets are generated by the CGN device, a plurality of log servers usually need to be correspondingly disposed for each CGN device.

Figure 2:
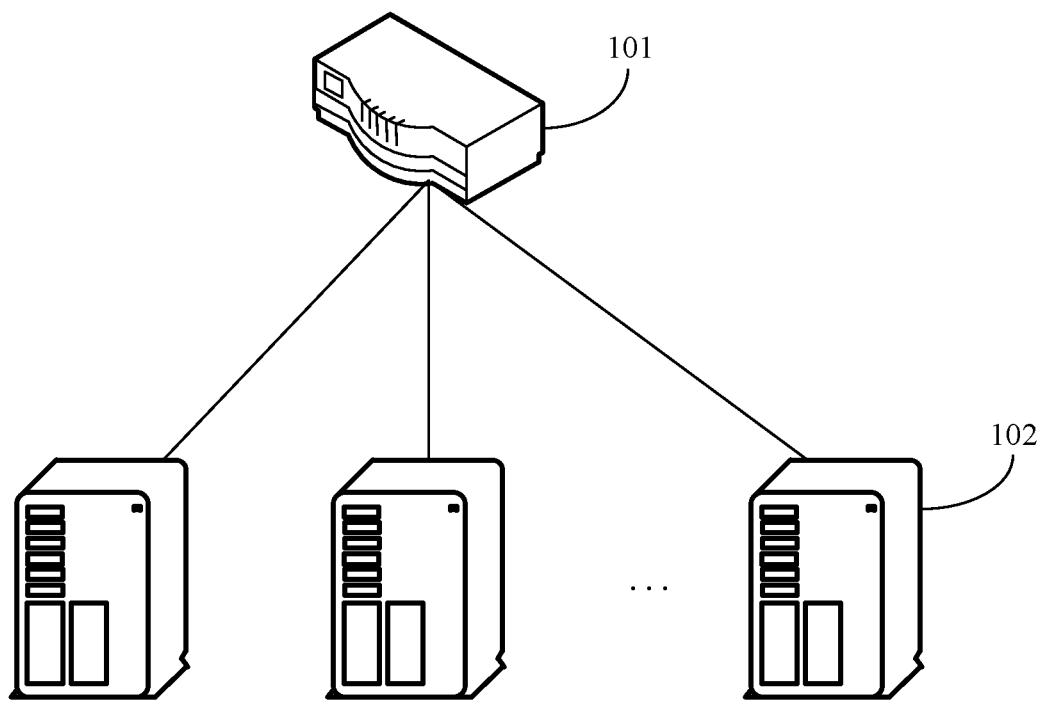
FIG. 2 is a schematic structural diagram of another data transmission system according to an embodiment of this application.

Optionally, FIG. 2 is a schematic structural diagram of another data transmission system according to an embodiment of this application. As shown in FIG. 2, the data transmission system includes one network device 101 and a plurality of log servers 102. The network device 101 periodically sends probe packets to the plurality of log servers 102 in a polling mode. After it is determined that a log server is not capable of receiving a packet, the network device 101 skips the log server that is not capable of receiving a packet when the network device 101 sends the log packets to the plurality of log servers 102 in the polling mode.

It should be noted that in this embodiment of this application, the plurality of log servers are deployed. After determining that a log server is not capable of receiving a packet (due to a communications link interruption or a server fault), the network device may skip the log server that is not capable of receiving a packet when the network device sends the log packets to the plurality of log servers in the polling mode, thereby improving reliability of log storage.

Figure 3:
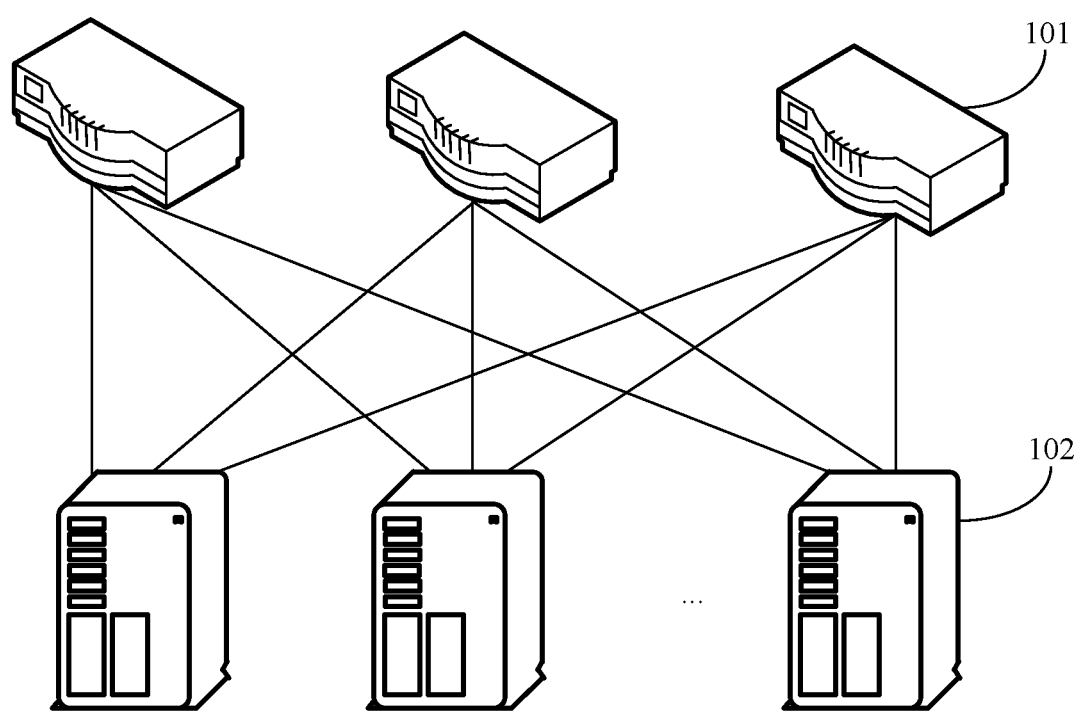
FIG. 3 is a schematic structural diagram of still another data transmission system according to an embodiment of this application.

Optionally, FIG. 3 is a schematic structural diagram of still another data transmission system according to an embodiment of this application. As shown in FIG. 3, the data transmission system includes a plurality of network devices 101 and a plurality of log servers 102. The plurality of network devices share the plurality of log servers, to maximize utilization of log server resources.

When types of probe packets sent by the network devices to the log servers are different, corresponding data transmission methods are different. The following embodiments of this application provide implementation processes of different data transmission methods for different types of probe packets.

Figure 4:
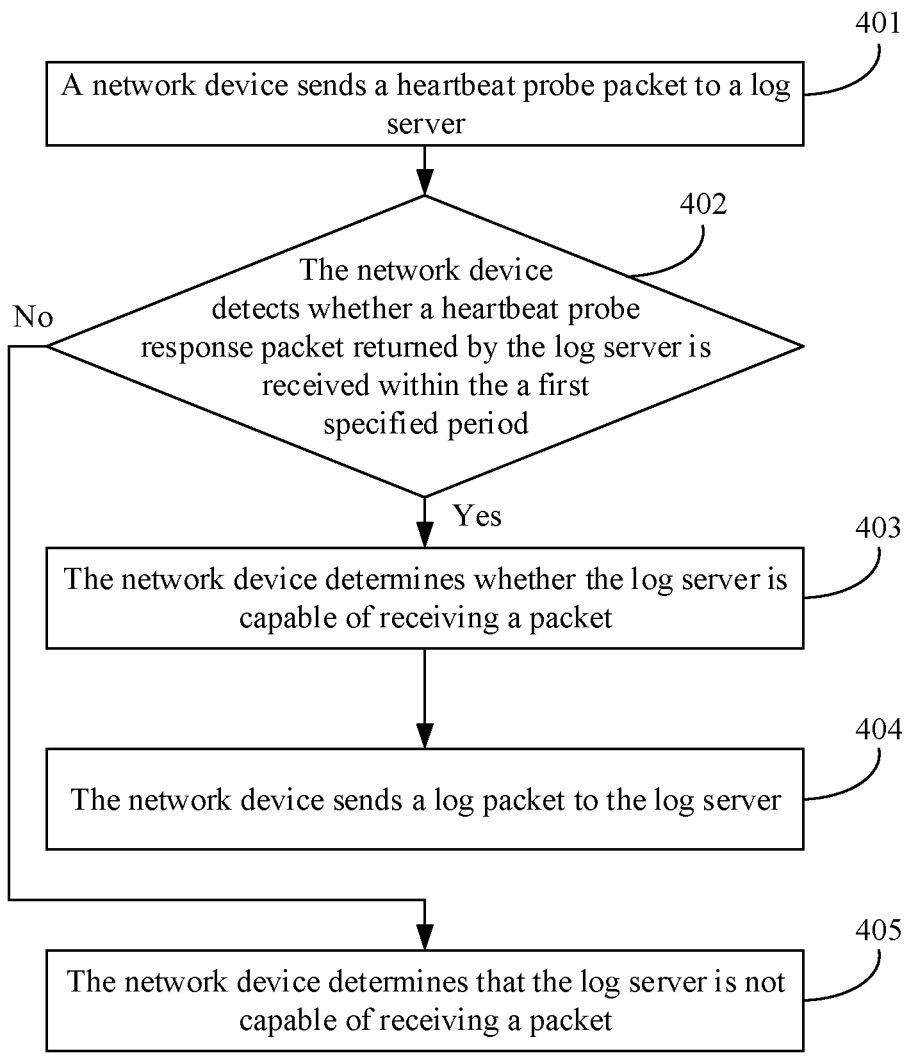
FIG. 4 is a flowchart of a data transmission method according to an embodiment of this application.

In an example, the probe packet is a heartbeat probe packet, and the probe response packet is a heartbeat probe response packet. Correspondingly, FIG. 4 is a flowchart of a data transmission method according to an embodiment of this application. The method may be used for any one of the data transmission systems shown in FIG. 1 to FIG. 3. As shown in FIG. 4, the method may include the following steps.

Step 401. A network device sends a heartbeat probe packet to a log server.

Optionally, the network device may periodically send the heartbeat probe packet to the log server. The heartbeat probe packet is a UDP-based packet. The heartbeat probe packet may be a request packet.

Figure 5:
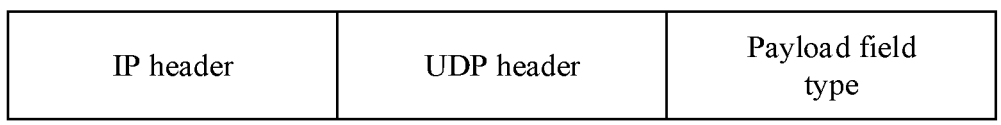
FIG. 5 is a schematic structural diagram of a heartbeat probe packet/heartbeat probe response packet according to an embodiment of this application.

For example, referring to FIG. 5, the heartbeat probe packet includes an IP header, a UDP header, and a payload field. The IP header includes an IP address (that is, a source address) of the network device that sends the heartbeat probe packet, and an IP address (that is, a destination address) of the log server that receives the heartbeat probe packet, the UDP header includes a source port number and a destination port number, and the payload field is used to carry a packet type. Optionally, the packet type of the heartbeat probe packet may be a single character, a character string, a letter, or a digit. A form of the packet type is not limited in this embodiment of this application. For example, when the type in FIG. 5 is 0, it indicates that the packet is a heartbeat probe packet.

Step 402. The network device detects whether a heartbeat probe response packet returned by the log server is received within a first specified period, and when the heartbeat probe response packet returned by the log server is received within the first specified period, step 403 is performed, or when the heartbeat probe response packet returned by the log server is not received within the first specified period, step 405 is performed.

Optionally, after receiving the heartbeat probe packet sent by the network device, the log server may generate a heartbeat probe response packet, and send the heartbeat probe response packet to the network device. The heartbeat probe response packet may be an ACK packet. When the log server returns the ACK packet to the network device, it indicates that the log server has successfully received a request packet.

A data frame structure of the heartbeat probe response packet is the same as a data frame structure of the heartbeat probe packet, and a packet type of the heartbeat probe packet is different from a packet type of the heartbeat probe response packet. For example, when the type in FIG. 5 is 0, it indicates that the packet is a heartbeat probe packet, or when the type in FIG. 5 is 1, it indicates that the packet is a heartbeat probe response packet.

It should be noted that when a communications link between the network device and the log server is interrupted or a fault (a hardware fault and/or an application-layer software fault) occurs on the log server, the log server is not capable of receiving a heartbeat probe packet sent by the network device, and the log server does not return a heartbeat probe response packet to the network device. Therefore, after sending the heartbeat probe packet to the log server, the network device may determine, by detecting whether the heartbeat probe response packet returned by the log server is received within the first specified period, whether the log server is capable of receiving a packet.

Optionally, the first specified period may also be referred to as a heartbeat timeout waiting time. For example, the first specified period may be one second. After the network device sends a heartbeat probe packet, if a heartbeat probe response packet returned by the log server is not received within one second, the network device may determine that the log server is not capable of receiving a packet.

Step 403. The network device determines that the log server is capable of receiving a packet.

Step 404. The network device sends a log packet to the log server.

It should be noted that after determining that the log server is capable of receiving a packet, the network device sends a log packet to the log server. This can improve reliability of log packet transmission and storage.

Step 405. The network device determines that the log server is not capable of receiving a packet.

Optionally, after determining that the log server is not capable of receiving a packet, the network device stops sending a log packet to the log server, to avoid a loss of the log packet.

Optionally, in this embodiment of this application, after step 405 is performed, return to step 401, and repeatedly perform the steps according to the data transmission method.

In conclusion, according to the data transmission method provided in this embodiment of this application, by establishing a heartbeat probe mechanism between the network device and the log server, the network device periodically sends a heartbeat probe packet to the log server, it is determined, by detecting whether a heartbeat probe response packet returned by the log server is received, whether the log server is capable of receiving a packet, and a packet is sent to the log server after it is determined that the log server is capable of receiving a packet, thereby improving reliability of the log packet transmission and storage.

Figure 6:
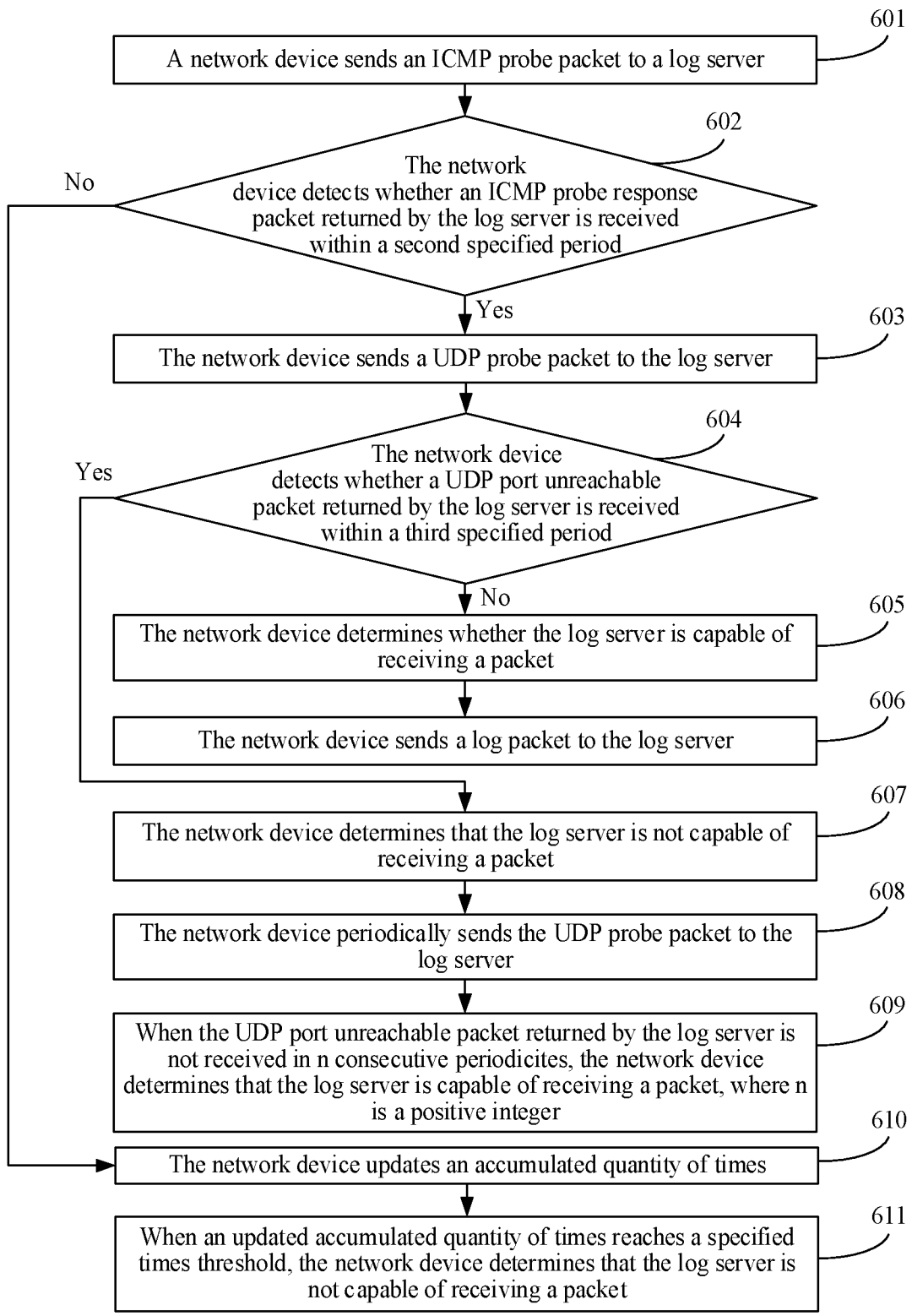
FIG. 6 is a flowchart of another data transmission method according to an embodiment of this application.

In another example, the probe packet includes an ICMP probe packet and a UDP probe packet, and the probe response packet includes an ICMP probe response packet and a UDP port unreachable packet. Correspondingly, FIG. 6 is a flowchart of another data transmission method according to an embodiment of this application. The method may be used for any one of the data transmission systems shown in FIG. 1 to FIG. 3. As shown in FIG. 6, the method may include the following steps.

Step 601. The network device sends an ICMP probe packet to a log server.

Optionally, the network device periodically sends the ICMP probe packet to the log server, where the ICMP probe packet may be a ping packet, and correspondingly, the ICMP probe response packet may be a pong packet.

Step 602. The network device detects whether an ICMP probe response packet returned by the log server is received within a second specified period, and when the ICMP probe response packet returned by the log server is received within the second specified period, step 603 is performed, or when the ICMP probe response packet returned by the log server is not received within the second specified period, step 610 is performed.

It should be noted that the ICMP probe packet is used to detect whether an IP address of the log server is reachable. When a communications link between the network device and the log server is interrupted or a physical port of the log server is unavailable due to a hardware fault on the log server, the log server is not capable of receiving an ICMP probe packet, that is, the IP address of the log server is unreachable.

Optionally, after receiving the ICMP probe packet sent by the network device, the log server may generate an ICMP probe response packet, and send the ICMP probe response packet to the network device.

Optionally, the second specified period may also be referred to as an ICMP timeout waiting time. For example, the second specified period may be one second. After the network device sends an ICMP probe packet, if an ICMP probe response packet returned by the log server is not received within one second, the network device may determine that the IP address of the log server is unreachable, and may further mark the log server as unavailable, or if the ICMP probe response packet returned by the log server is received within one second, the network device may determine that the IP address of the log server is reachable, and may further mark the log server as available.

Step 603. The network device sends a UDP probe packet to the log server.

It should be noted that the operating principle of UDP probe is as follows. When a UDP port of the log server is unavailable because the UDP port is faulty or disabled, the log server returns a UDP port unreachable packet after receiving a UDP probe packet sent by the network device, or when a UDP port of the log server is available, the log server does not respond to the UDP probe packet sent by the network device, that is, the log server does not return a probe response packet to the network device. The UDP port refers to a log service port of the log server, and may also be referred to as an application port or a software port. The UDP probe packet is used to detect whether a software application layer of the log server is available.

Optionally, in this embodiment of this application, the network device sends a log packet to the log server based on the UDP, and therefore the UDP probe packet sent by the network device to the log server in step 603 may be a log packet. Optionally, the UDP probe packet may also be an empty packet, that is, a payload part of the packet is empty. In this case, the UDP probe packet is used only for UDP probe. This is not limited in this embodiment of this application.

Step 604. The network device detects whether a UDP port unreachable packet returned by the log server is received within a third specified period, and when the UDP port unreachable packet returned by the log server is not received within the third specified period, step 605 is performed, or when the UDP port unreachable packet returned by the log server is received within the third specified period, step 607 is performed.

Optionally, the third specified period may also be referred to as UDP timeout waiting time. For example, the third specified period may be one second. After the network device sends a UDP probe packet, if a UDP port unreachable packet returned by the log server is received within one second, the network device may determine that the log server is not capable of receiving a packet.

Step 605. The network device determines that the log server is capable of receiving a packet.

Step 606. The network device sends a log packet to the log server.

It should be noted that after determining that the log server is capable of receiving a packet, the network device sends a log packet to the log server. This can improve reliability of log packet transmission and storage.

Step 607. The network device determines that the log server is not capable of receiving a packet.

Optionally, when the UDP probe packet sent by the network device to the log server in step 603 is a log packet, after the network device determines that the log server is not capable of receiving a packet, the network device stops sending another log packet to the log server, to avoid a loss of the log packet.

Step 608. The network device periodically sends a UDP probe packet to the log server.

It should be noted that when the log server is marked as available, that is, the IP address of the log server is reachable, the network device periodically sends the UDP probe packet to the log server.

The UDP probe packet in step 608 is an empty packet, and the UDP probe packet is used only to detect whether a UDP port of the log server is available.

Step 609. When the UDP port unreachable packet returned by the log server is not received within n consecutive time periods, the network device determines that the log server is capable of receiving a packet, where n is a positive integer.

For example, after the network device sends a UDP probe packet to the log server in three consecutive time periods, if the UDP port unreachable packet returned by the log server is not received, the network device determines that the log server is capable of receiving a packet.

Optionally, after the network device determines that the log server is capable of receiving a packet, step 606 is performed.

Step 610. The network device updates an accumulated quantity of times.

An updated accumulated quantity of times is a quantity of times for which the network device sends an ICMP probe packet to the log server from a moment after a latest ICMP probe response packet returned by the log server is received to a current moment.

It should be noted that each time the network device receives an ICMP probe response packet returned by the log server, the accumulated quantity of times is reset to zero, and when the network device does not receive the ICMP probe response packet returned by the log server within the second specified period after the network device sends the ICMP probe packet to the log server, the accumulated quantity of times is increased by 1.

For example, if the network device receives, in a previous time period of sending an ICMP probe packet, an ICMP probe response packet returned by the log server, the updated accumulated quantity of times of the network device is 0 in step 610, and if the network device does not receive, in m consecutive time periods of sending an ICMP probe packet before a current moment, an ICMP probe response packet returned by the log server, the updated accumulated quantity of times of the network device is m+1 in step 610, where $m \geq 1$.

Step 611. When the updated accumulated quantity of times reaches a specified times threshold, the network device determines that the log server is not capable of receiving a packet.

For example, the specified times threshold may be 3. The specified times threshold is not limited in this embodiment of this application.

Optionally, when the updated accumulated quantity of times reaches the specified times threshold, the network device may determine that the IP address of the log server is unreachable, and further determine that the log server is not capable of receiving a packet. When the updated accumulated quantity of times does not reach the specified times threshold, step 601 to step 611 may be repeatedly performed.

Optionally, in this embodiment of this application, after step 611 is performed, return to step 601, and repeatedly perform the steps according to the data transmission method.

In conclusion, according to the data transmission method provided in this embodiment of this application, an ICMP probe mechanism and a UDP probe mechanism are established between the network device and the log server. The network device detects, in an ICMP probe manner, whether an IP address of the log server is reachable, and detects, in a UDP probe manner, whether a UDP port of the log server is available, it is further determined whether the log server is capable of receiving a packet, and a log packet is sent to the log server after it is determined that the log server is capable of receiving a packet, thereby improving reliability of log packet transmission and storage.

It should be noted that according to the foregoing two data transmission methods, in the data transmission method based on heartbeat probe, a heartbeat probe mechanism is established between the network device and the log server, and the network device only needs to send a heartbeat probe packet to the log server to detect whether the log server is capable of receiving a packet. Compared with the data transmission method based on a combination of ICMP probe and UDP probe, a smaller quantity of transmission resources are occupied by a probe packet in this data transmission method. In the data transmission method based on the combination of ICMP probe and UDP probe, no new communications mechanism needs to be established between the network device and the log server, and universality of the method is relatively high, for an operator scenario, there are more types and quantities of third-party server vendors that interconnect with the CGN device, and therefore the method is relatively easier to implement.

Optionally, in this embodiment of this application, the heartbeat probe, the ICMP probe, and the UDP probe may be further combined to detect whether the log server is capable of receiving a packet, to further improve log storage reliability. Alternatively, whether the log server is capable of receiving a packet may be detected based on another probe mechanism. A used probe mechanism is not limited in this embodiment of this application.

It should be noted that a sequence of steps of the data transmission methods provided in the embodiments of this application may be properly adjusted, and a step may be correspondingly added or removed based on a situation. Any variation readily figured out by a person skilled in the art within the technical scope disclosed in this application shall fall within the protection scope of this application, and details are not described herein.

Figure 7:
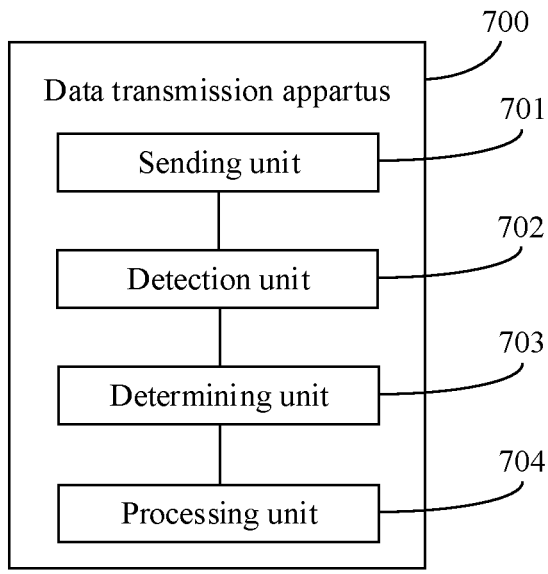
FIG. 7 is a schematic structural diagram of a data transmission apparatus according to an embodiment of this application.

FIG. 7 is a schematic structural diagram of a data transmission apparatus according to an embodiment of this application. The data transmission apparatus is used for a network device, and may implement a function of the network device in the embodiment shown in FIG. 4 or FIG. 6. As shown in FIG. 7, the data transmission apparatus 700 includes a sending unit 701, a detection unit 702, a determining unit 703, and a processing unit 704. These units may perform corresponding functions of the network device in the foregoing method embodiments. The sending unit 701 is configured to support the network device in performing step 401 and step 404 in FIG. 4, and/or step 601, step 603, step 606, and step 608 in FIG. 6. The detection unit 702 is configured to support the network device in performing step 402 in FIG. 4 and/or step 602 and step 604 in FIG. 6. The determining unit 703 is configured to support the network device in performing step 403 and step 405 in FIG. 4, and/or step 605, step 607, step 609, and step 611 in FIG. 6. The processing unit 704 is configured to support the network device in performing step 610 in FIG. 6, and/or another process performed by the network device in the technology described in this specification. For example, the sending unit 701 is configured to implement various information sending performed by the network device in the foregoing method embodiments, the detection unit 702 is configured to implement a detection action performed by the network device in the foregoing method embodiments, the determining unit 703 is configured to implement a determining action performed by the network device in the foregoing method embodiments, and the processing unit 704 is configured to implement processing other than the information sending, the detection action, and the determining action that are performed by the network device in the foregoing method embodiments. For example, the sending unit 701 is configured to send a probe packet to the log server, the detection unit 702 is configured to determine, depending on whether a probe response packet returned by the log server is received, whether the log server is capable of receiving a packet, and sending unit 701 is further configured to send a log packet to the log server after it is determined that the log server is capable of receiving a packet. For a specific execution process, refer to the detailed descriptions of the corresponding steps in the embodiment shown in FIG. 4 or FIG. 6. Details are not described herein again in this embodiment of this application.

Figure 8:
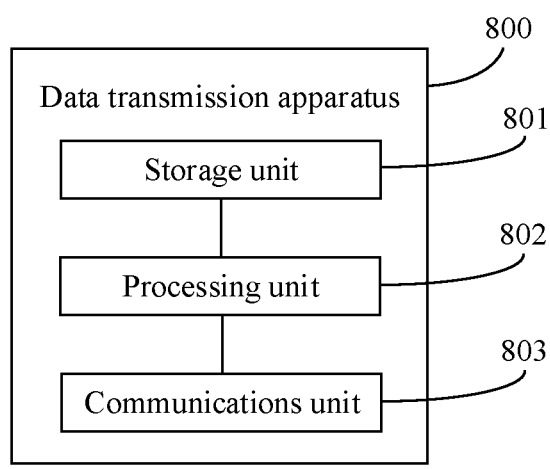
FIG. 8 is a schematic structural diagram of another data transmission apparatus according to an embodiment of this application.

When an integrated unit is used, FIG. 8 is another possible schematic structural diagram of the data transmission apparatus in the foregoing embodiment. The data transmission apparatus 800 may also implement a function of the network device in the embodiment shown in FIG. 4 or FIG. 6. The data transmission apparatus 800 includes a storage unit 801, a processing unit 802, and a communications unit 803. The communications unit 803 is configured to support the network device in communicating with another network entity, for example, communicating with the log server shown in FIG. 4 or FIG. 6. For example, the communications unit 803 is configured to support the network device in performing step 401 and step 404 in FIG. 4, and/or step 601, step 603, step 606, and step 608 in FIG. 6. The processing unit 802 is configured to control and manage an action of the network device. For example, the processing unit 802 is configured to support the network device in performing step 402, step 403, and step 405 in FIG. 4, step 602, step 604, step 605, step 607, step 609, step 610, and step 611 in FIG. 6, and/or another process performed by the network device in the technology described in this specification. The storage unit 801 is configured to store program code and data of the network device. For a specific execution process, refer to the detailed descriptions of the corresponding steps in the embodiment shown in FIG. 4 or FIG. 6. Details are not described herein again in this embodiment of this application.

The processing unit 802 may be a processor, for example, may be a central processing unit (CPU), a general-purpose processor, a digital signal processor (DSP), an application-specific integrated circuit (ASIC), a field-programmable gate array (FPGA), or another programmable logical device, a transistor logical device, a hardware component, or any combination thereof. The controller/processor may implement or execute various example logical blocks, modules, and circuits described with reference to content disclosed in the embodiments of this application. The processor may be a combination of processors implementing a computing function, for example, a combination of one or more microprocessors, or a combination of the DSP and a microprocessor. The communications unit 803 may be a transceiver, and the storage unit 801 may be a memory.

Figure 9:
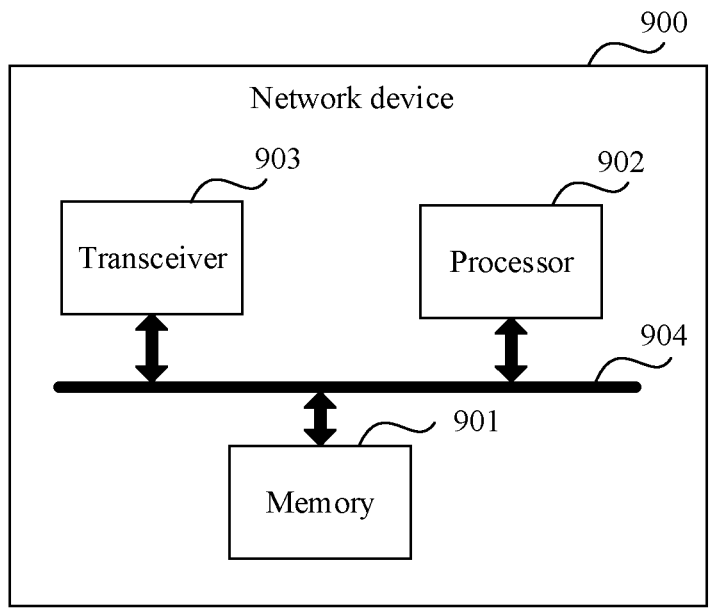
FIG. 9 is a schematic structural diagram of a network device according to an embodiment of this application.

When the processing unit 802 is a processor, the communications unit 803 is a transceiver, and the storage unit 801 is a memory, a structure of the network device in this embodiment of this application may be shown in FIG. 9.

Referring to FIG. 9, the network device 900 includes a processor 902, a transceiver 903, a memory 901, and a bus 904. The transceiver 902, the processor 903, and the memory 901 are connected to each other by using the bus 904. The bus 904 may be a peripheral component interconnect standard (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus. The network device 900 may implement a function of the network device in the embodiment shown in FIG. 4 or FIG. 6. The processor 902 and the transceiver 903 may implement corresponding functions of the network device in the foregoing method examples. The transceiver 903 is configured to support the network device 900 in performing step 401 and step 404 in FIG. 4, and/or step 601, step 603, step 606, and step 608 in FIG. 6. The processing unit 902 is configured to support the network device 900 in performing step 402, step 403 and step 405 in FIG. 4, step 602, step 604, step 605, step 607, step 609, step 610, and step 611 in FIG. 6, and/or another process performed by the network device in the technology described in this specification. The memory 901 is configured to store program code and data of the network device 900. For a specific execution process, refer to the detailed descriptions of the corresponding steps in the embodiment shown in FIG. 4 or FIG. 6. Details are not described herein again in this embodiment of this application.

Figure 10:
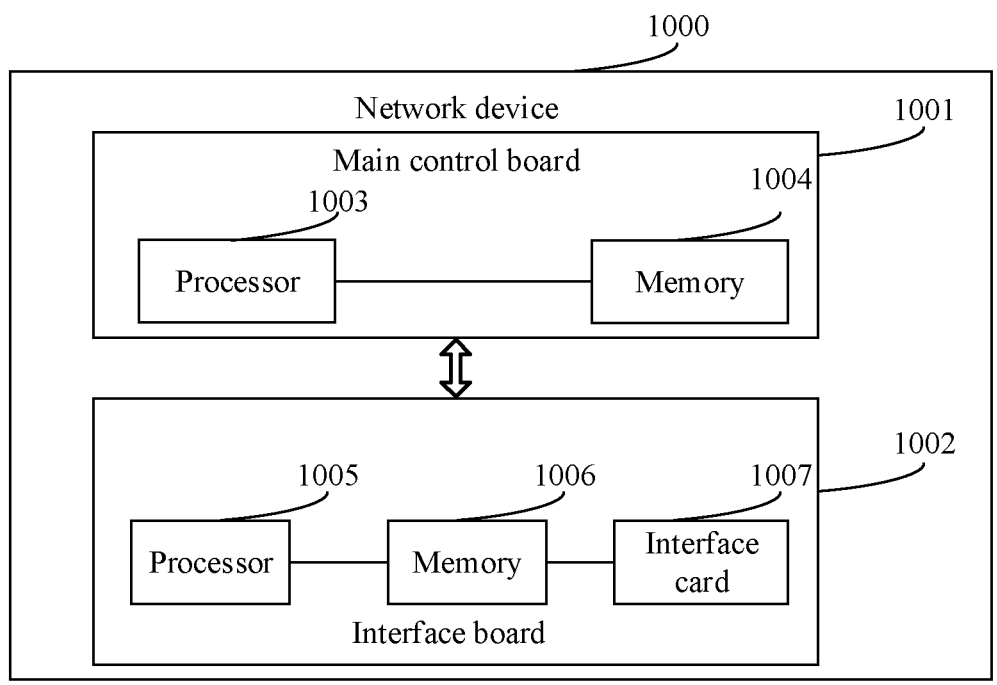
FIG. 10 is a schematic structural diagram of another network device according to an embodiment of this application.

FIG. 10 is a schematic structural diagram of another network device 1000 according to an embodiment of this application. The network device 1000 may be a network device that has a function of NAT and can forward data, such as a router or a switch. The network device 1000 can implement a function of the network device in the foregoing method embodiments. The network device 1000 includes a main control board 1001 and an interface board 1002. The main control board 1001 includes a processor 1003 and a memory 1004. The interface board 1002 includes a processor 1005, a memory 1006, and an interface card 1007. The main control board 1001 is coupled to the interface board 1002.

The hardware may perform corresponding functions in the foregoing method examples. For example, the memory 1006 is configured to store program code of the interface board 1002, and the processor 1005 is configured to invoke the program code in the memory 1006 to trigger the interface card 1007 to implement various information receiving and sending performed by the network device in the foregoing method embodiments. For example, the processor 1005 invokes the program code in the memory 1006 to trigger the interface card 1007 to support the network device 1000 in performing step 401 and step 404 in FIG. 4, and/or step 601, step 603, step 606, and step 608 in FIG. 6. The processor 1005 is further configured to send a service identity to the main control board 1001. The memory 1004 may be further configured to store program code of the main control board 1001, and the processor 1003 is configured to invoke the program code in the memory 1004 to perform processing other than information receiving and sending of the network device in the foregoing method embodiments. For example, the processing unit 1003 is configured to support the network device 1000 in performing step 402, step 403 and step 405 in FIG. 4, step 602, step 604, step 605, step 607, step 609, step 610, and step 611 in FIG. 6, and/or another process performed by the network device in the technology described in this specification. The storage unit 1004 is configured to store program code and data of the main control board 1001. For a specific execution process, refer to the detailed descriptions of the corresponding steps in the embodiment shown in FIG. 4 or FIG. 6. Details are not described herein again in this embodiment of this application.

In a possible implementation, an inter-process communication (IPC) control channel is established between the main control board 1001 and the interface board 1002, and the main control board 1001 and the interface board 1002 communicate with each other by using the IPC control channel.

A computer-readable storage medium is provided in this embodiment of this application, where the computer-readable storage medium stores an instruction, and when the instruction is executed by the processor, the data transmission method according to either of the method embodiments is implemented.

It should be noted that any apparatus embodiment described above is one example of this description. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the network device embodiments provided by this application, connection relationships between modules indicate that the modules have communication connections with each other, which may be specifically implemented as one or more communications buses or signal cables. A person of ordinary skill in the art may understand and implement the embodiments of the present disclosure without creative efforts.

Methods or algorithm steps described in combination with the content disclosed in this embodiment of this application may be implemented by hardware, or may be implemented by a processor by executing a software instruction. The software instruction may include a corresponding software module. The software module may be stored in a random-access memory (RAM), a flash memory, a read-only memory (ROM), an erasable programmable read only memory (EPROM), an electrically erasable programmable read-only memory (EEPROM), a hard disk, a mobile hard disk, a compact disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions include various embodiments of this application, but are not intended to limit this application. Any modification, equivalent replacement, or improvement made without departing from the spirit and principle of this application should fall within the protection scope of this application.

What is claimed is:

1. A data transmission method implemented by a network device and comprising:
   sending a probe packet to a log server, wherein the probe packet is a heartbeat probe packet and is based on Internet Control Message Protocol (ICMP) and User Datagram Protocol (UDP);
   determining whether a probe response packet is received from the log server, wherein the probe response packet is a heartbeat probe response packet communicated in response to the probe packet, and wherein the probe response packet is based on the ICMP and the UDP;
   determining, based on whether the probe response packet is received from the log server, whether the log server is capable of receiving a packet; and
   sending a log packet to the log server when the log server is capable of receiving the packet,
   wherein the log packet comprises a correspondence between a public Internet Protocol (IP) address and a private IP address.

2. The data transmission method of claim 1, wherein the data transmission method further comprises:
   detecting whether the heartbeat probe response packet is received within a first specified period;
   determining that the log server is capable of receiving the packet when the heartbeat probe response packet is received within the first specified period; and
   determining that the log server is not capable of receiving the packet when the heartbeat probe response packet is not received within the first specified period.

3. The data transmission method of claim 1, wherein the probe packet comprises an ICMP probe packet and a UDP probe packet, wherein the probe response packet comprises an ICMP probe response packet and a UDP port unreachable packet, and wherein the data transmission method further comprises:
   detecting whether the ICMP probe response packet is received within a second specified period;
   sending the UDP probe packet to the log server when the ICMP probe response packet is received within the second specified period;
   determining that the log server is not capable of receiving the packet when the UDP port unreachable packet is received within a third specified period; and
   determining that the log server is capable of receiving the packet when the UDP port unreachable packet is not received within the third specified period.

4. The data transmission method of claim 3, wherein after detecting whether the ICMP probe response packet is received within the second specified period, the data transmission method further comprises:
   updating an accumulated quantity of times when the ICMP probe response packet is not received within the second specified period, wherein an updated accumulated quantity of times is a quantity of times for which the network device sends the ICMP probe packet to the log server from a moment after a latest ICMP probe response packet is received to a current moment; and
   determining that the log server is not capable of receiving the packet when the updated accumulated quantity of times reaches a specified times threshold.

5. The data transmission method of claim 3, wherein after determining that the log server is not capable of receiving the packet, the data transmission method further comprises:
   periodically sending the UDP probe packet to the log server; and
   determining that the log server is capable of receiving the packet when the UDP port unreachable packet is not received in a plurality of consecutive time periods.

6. The data transmission method of claim 1, further comprising generating a quantity of log packets during a running process.

7. The data transmission method of claim 6, further comprising deploying a plurality of log servers to receive the log packets in response to generating the quantity of log packets.

8. The data transmission method of claim 1, wherein the probe packet and the probe response packet have a same data frame structure, but are of a different packet type.

9. A data transmission apparatus comprising:
   a memory configured to store instructions; and
   a processor coupled to the memory and configured to execute the instructions to cause the data transmission apparatus to:
   send a probe packet to a log server, wherein the probe packet is a heartbeat probe packet and is based on Internet Control Message Protocol (ICMP) and User Datagram Protocol (UDP);
   determine whether a probe response packet is received from the log server, wherein the probe response packet is a heartbeat probe response packet communicated non-regularly and in response to the probe packet, and wherein the probe response packet is based on the ICMP and the UDP;
   determine, based on whether the probe response packet is received from the log server, whether the log server is capable of receiving a packet; and
   send a log packet to the log server when the log server is capable of receiving the packet,
   wherein the log packet comprises a correspondence between a public Internet Protocol (IP) address and a private IP address.

10. The data transmission apparatus of claim 9, wherein the processor is further configured to execute the instructions to cause the data transmission apparatus to:
- detect whether the heartbeat probe response packet is received within a first specified period;
- determine that the log server is capable of receiving the packet when the heartbeat probe response packet is received within the first specified period; and
- determine that the log server is not capable of receiving the packet when the heartbeat probe response packet is not received within the first specified period.

11. The data transmission apparatus of claim 9, wherein the probe packet comprises an ICMP probe packet and a UDP probe packet, wherein the probe response packet comprises an ICMP probe response packet and a UDP port unreachable packet, and wherein the processor is further configured to execute the instructions to cause the data transmission apparatus to:
- detect whether the ICMP probe response packet is received within a second specified period;
- send the UDP probe packet to the log server when the ICMP probe response packet is received within the second specified period;
- determine that the log server is not capable of receiving the packet when the UDP port unreachable packet is received within a third specified period; and
- determine that the log server is capable of receiving the packet when the UDP port unreachable packet is not received within the third specified period.

12. The data transmission apparatus of claim 11, wherein the processor is further configured to execute the instructions to cause the data transmission apparatus to:
- update an accumulated quantity of times when the ICMP probe response packet is not received within the second specified period, wherein an updated accumulated quantity of times is a quantity of times for which the data transmission apparatus sends the ICMP probe packet to the log server from a moment after a latest ICMP probe response packet is received to a current moment; and
- determine that the log server is not capable of receiving the packet when the updated accumulated quantity of times reaches a specified times threshold.

13. The data transmission apparatus of claim 11, wherein the processor is further configured to execute the instructions to cause the data transmission apparatus to:
- periodically send the UDP probe packet to the log server after the log server is not capable of receiving the packet; and
- determine that the log server is capable of receiving the packet when the UDP port unreachable packet is not received in a plurality of consecutive time periods.

14. The data transmission apparatus of claim 9, wherein the processor is further configured to execute the instructions to cause the data transmission apparatus to generate a quantity of log packets during a running process.

15. The data transmission apparatus of claim 14, wherein the processor is further configured to execute the instructions to cause the data transmission apparatus to be configured to deploy a plurality of log servers to receive the log packets in response to generating the quantity of log packets.

16. The data transmission apparatus of claim 9, wherein the probe packet and the probe response packet have a same data frame structure, but are of a different packet type.

17. A data transmission system comprising:
- a log server; and
- a network device comprising a data transmission apparatus configured to:
  - send a probe packet to the log server, wherein the probe packet is a heartbeat probe packet and is based on Internet Control Message Protocol (ICMP) and User Datagram Protocol (UDP);
  - determine whether a probe response packet is received from the log server, wherein the probe response packet is a heartbeat probe response packet communicated non-regularly and in response to the probe packet, and wherein the probe response packet is based on the ISMP and the UDP:
  - determine, based on whether the probe response packet is received from the log server, whether the log server is capable of receiving a packet; and
  - send a log packet to the log server when the log server is capable of receiving the packet,
  - wherein the log packet comprises a correspondence between a public Internet Protocol (IP) address and a private IP address.

18. The data transmission system of claim 17, wherein the data transmission apparatus is further configured to:
- detect whether the heartbeat probe response packet is received within a first specified period;
- determine that the log server is capable of receiving the packet when the heartbeat probe response packet is received within the first specified period; and
- determine that the log server is not capable of receiving the packet when the heartbeat probe response packet is not received within the first specified period.

19. The data transmission system of claim 17, wherein the probe packet comprises an ICMP probe packet and a UDP probe packet, wherein the probe response packet comprises an ICMP probe response packet and a UDP port unreachable packet, and wherein the data transmission apparatus is further configured to:
- detect whether the ICMP probe response packet is received within a second specified period;
- send the UDP probe packet to the log server when the ICMP probe response packet is received within the second specified period;
- determine that the log server is not capable of receiving the packet when the UDP port unreachable packet is received within a third specified period; and
- determine that the log server is capable of receiving the packet when the UDP port unreachable packet is not received within the third specified period.

20. The data transmission system of claim 19, wherein the data transmission apparatus is further configured to:
- update an accumulated quantity of times when the ICMP probe response packet is not received within the second specified period, wherein an updated accumulated quantity of times is a quantity of times for which the network device sends the ICMP probe packet to the log server from a moment after a latest ICMP probe response packet is received to a current moment; and
- determine that the log server is not capable of receiving the packet when the updated accumulated quantity of times reaches a specified times threshold.

21. The data transmission system of claim 19, wherein the data transmission apparatus is further configured to:
- periodically send the UDP probe packet to the log server after the log server is not capable of receiving the packet; and
- determine that the log server is capable of receiving the packet when the UDP port unreachable packet is not received in a plurality of consecutive time periods.

22. The data transmission system of claim 17, wherein the data transmission apparatus is further configured to:
   generate a quantity of log packets during a running process; and
   deploy a plurality of log servers to receive the log packets in response to the data transmission apparatus generating the quantity of log packets.

23. The data transmission system of claim 17, wherein the probe packet and the probe response packet have a same data frame structure, but are of a different packet type.

\* \* \* \* \*